Feb. 17, 1959  A. GRANT ET AL  2,873,981
GENERAL PURPOSE EXTENSIBLE HITCH
Filed Jan. 6, 1955  3 Sheets-Sheet 1
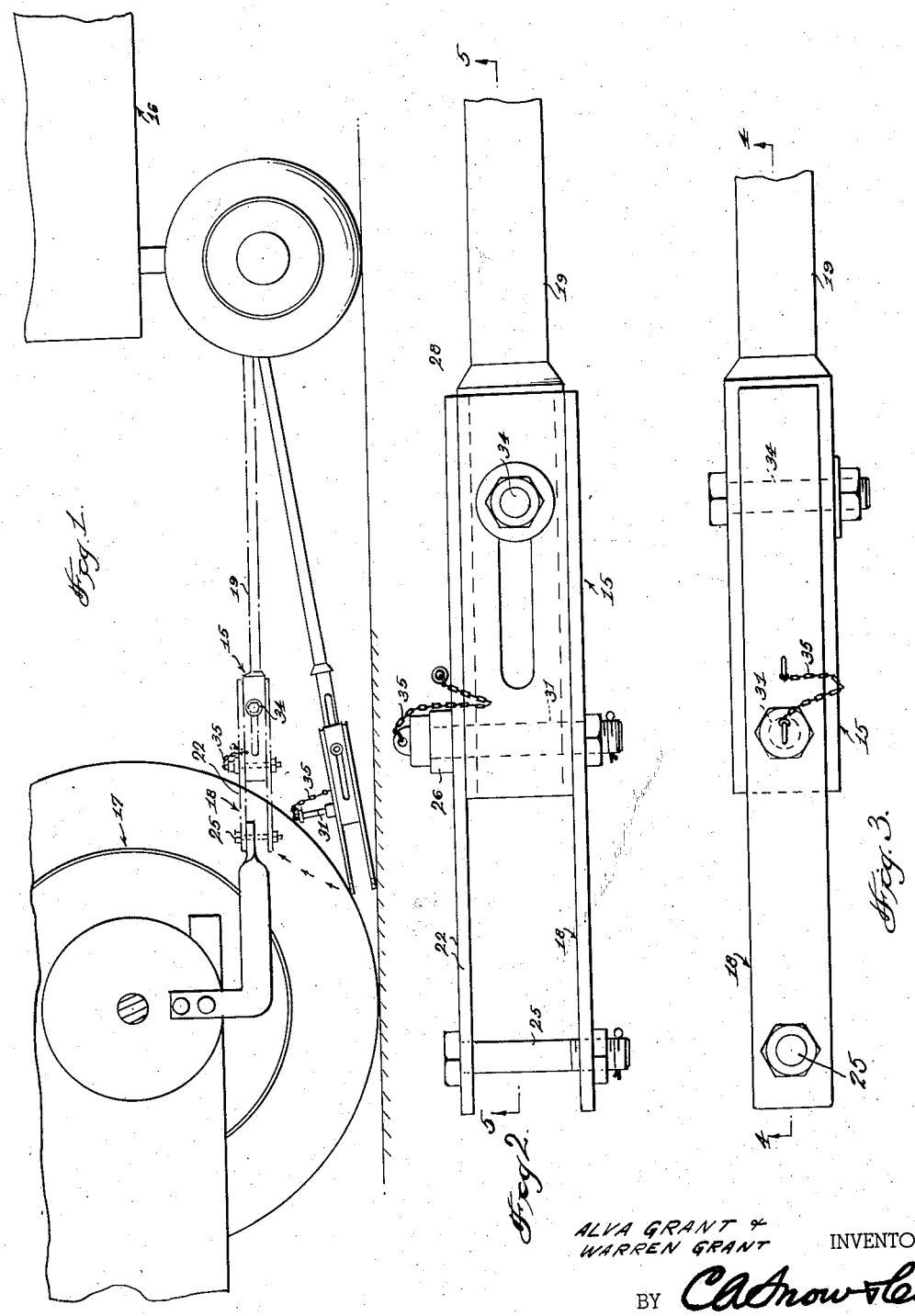
ALVA GRANT &
WARREN GRANT  INVENTORS
BY CA Snow & Co.
ATTORNEYS.

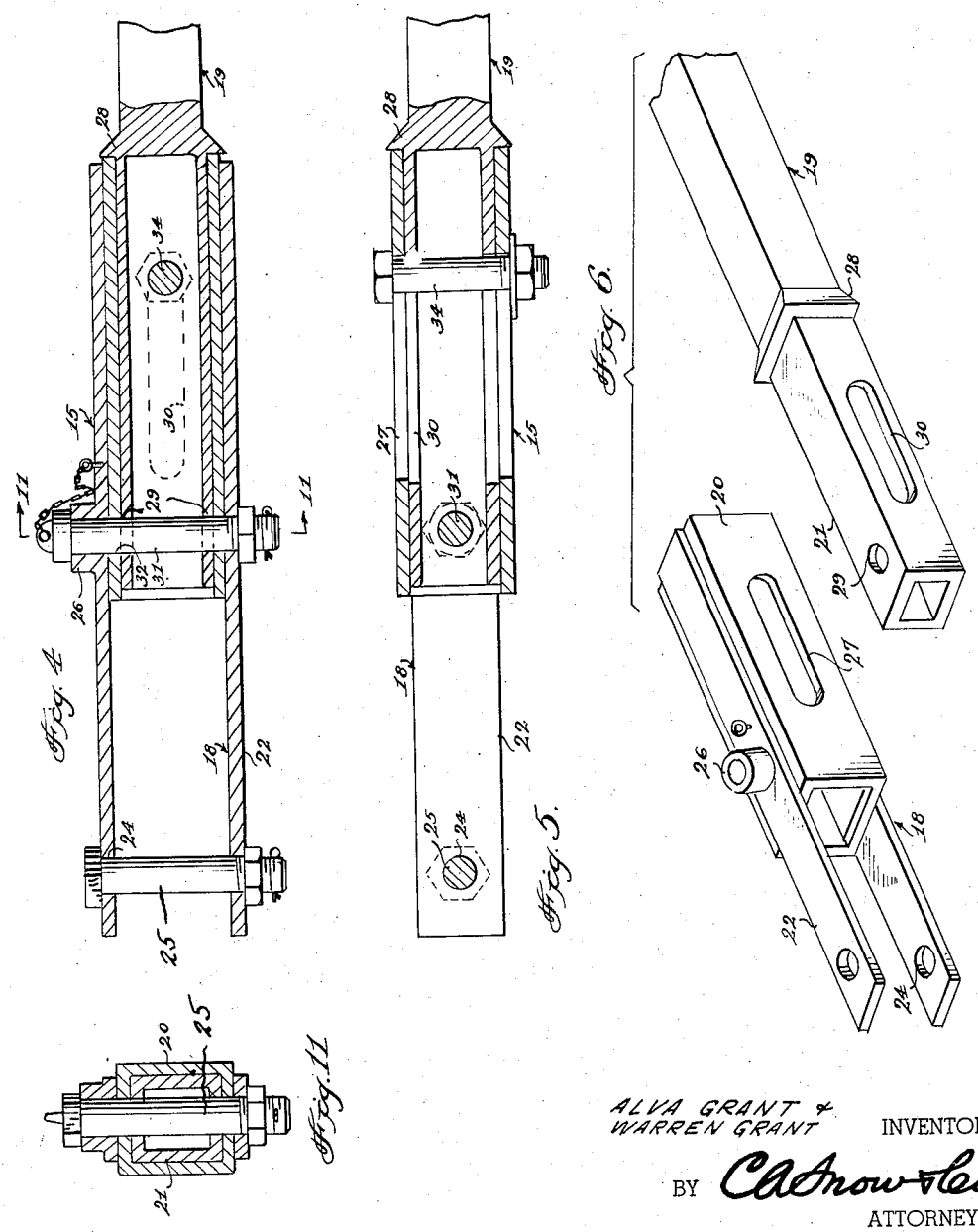

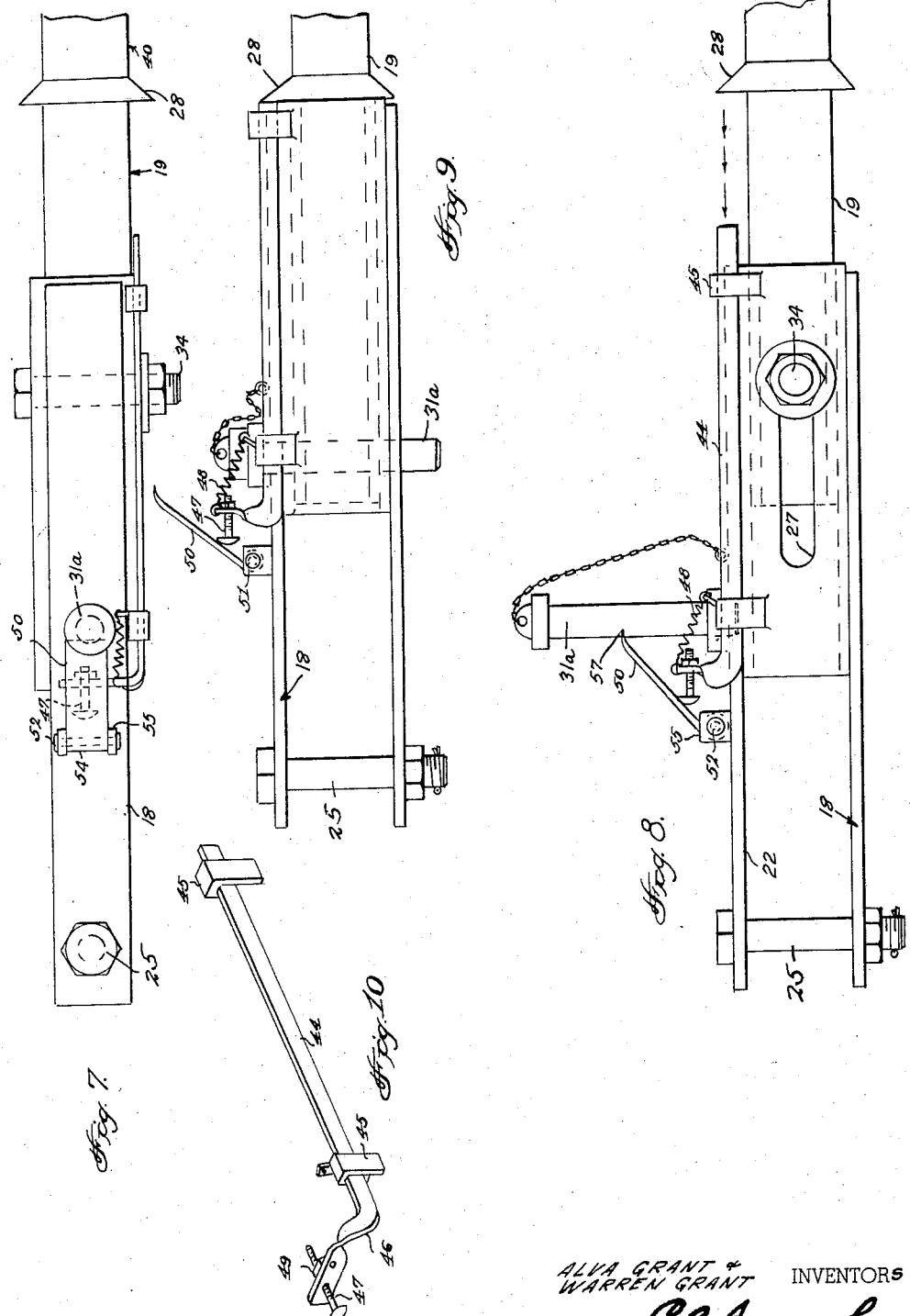
Feb. 17, 1959   A. GRANT ET AL   2,873,981
GENERAL PURPOSE EXTENSIBLE HITCH
Filed Jan. 6, 1955   3 Sheets-Sheet 3
ALVA GRANT &
WARREN GRANT   INVENTORS
BY
ATTORNEYS.

United States Patent Office 2,873,981
Patented Feb. 17, 1959

2,873,981
GENERAL PURPOSE EXTENSIBLE HITCH
Alva Grant and Warren Grant, Elroy, Wis.

Application January 6, 1955, Serial No. 480,144

1 Claim. (Cl. 280—477)

This invention relates to a hitch constructed and arranged for general use and purposes.

It is a primary object of this invention to provide a general purpose hitch of the kind to be more particularly described hereinafter designed to eliminate the necessity of lifting and attaching machinery to be towed to a tractor used for towing the machinery although it is, by its structure adapted for many uses between the towing tractor and the towed implement.

It is another object of this invention to provide a general purpose hitch of this kind whereby the telescopically arranged portions may be individually connected to the separate tongues of the tractor device and trailer implement before a king, or connecting pin, is engaged through the telescoped portions thereby avoiding this dangerous operation when attempted with the present type of hitches between said machinery and implements at the present time.

Other and further objects and advantages of the invention will be hereinafter described and the novel features thereof defined in the appended claim.

In the drawings:

Fig. 1 is a side elevation, partly broken away, of a general purpose hitch constructed according to an embodiment of our invention.

Fig. 2 is an enlarged side elevation, partly broken away, of this hitch.

Fig. 3 is a plan view thereof.

Fig. 4 is a longitudinal section, partly broken away, of the hitch taken on the line 4—4 of Fig. 3.

Fig. 5 is a longitudinal section, partly broken away, taken on the line 5—5 of Fig. 2.

Fig. 6 is a perspective view, partly broken away, of the separated hitch members.

Fig. 7 is a plan view of a modified form of our novel hitch.

Fig. 8 is a side elevation, partly broken away, of the modified hitch with the inter-engaging hitch members in their unlocked relation to each other.

Fig. 9 is a side elevation, partly broken away, with certain parts omitted, of the elements of the modified hitch in their locked position.

Fig. 10 is a perspective view of the lock members of our modified hitch removed from its respective hitch member.

Fig. 11 is a transverse section taken on the line 11—11 of Fig. 4 of the first shown form of our hitch.

Frequently on farms or in other locations there are occasions to connect a tractor to a farm implement for moving the farm implement across a length of ground. Sometimes it is the occasion to connect one implement onto another with both of them connected to a tractor or source of tractor power in the form and result of a train. In forming such train, or portion thereof, it is a general practice to connect the members together by a hitch which can be connected or disconnected manually to connect together or disconnect the separate implements and tractor.

It is with this purpose in mind that we have provided the general purpose hitch, designated generally by the reference numeral 15 in the drawings, so that the various implements may be connected together or to a tractor, and separated from each other or from a tractor as desired by the person wishing to connect or disconnect the various implements.

Referring now more particularly to the drawings we have provided a general purpose hitch 15 for connecting a tractor 16 and trailer 17 the hitch 15 being connectable with either the tractor or trailer as desired.

The general purpose hitch 15 includes a longitudinally extending hitch bar 18 connected at one end to the trailer and a tow bar 19 connected at one end to a tractor. The tractor is a general type of tractor as, for example, a farm tractor or a truck.

The hitch bar 18 is telescopically engaged with one end of the tow bar 19 after the bars are connected to the tractor and trailer in such a manner that a person may raise the free ends of the bars simultaneously at which time the tractor 16 may be reversed so that the tow bar may be engaged with the hitch bar by the connection of a slidable connecting pin engaging through the free end of the various bars.

The bars 18 and 19 may be of a conventional type and elongated configuration but the hitch bar 18 is provided with an enlarged rectangular tubular end 20 which is telescopically engaged with a smaller rectangular tubular end 21 on the tow bar 19 as can be clearly known from a consideration of the attached drawings. The enlarged ends 20 and 21 of the hitch bar 18 and tow bar 19 are longitudinally spaced on the bar from the connection of one end of each bar to the respective tractor and trailer.

The hitch bar 18 is provided with a pair of longitudinally extending and laterally spaced apart arms 22 extending in overlying relation to the tube 20 and extending longitudinally therefrom, each of the bars 22 having an opening 24 at the end thereof spaced from the end 20 for reception therein of a connecting pin 25 used to connect the hitch bar to the trailer. One of the arms 22 has an outwardly extending bushing 26 formed therewith or secured thereto and one side of the rectangular telescoping tube is provided with a longitudinally extending slot 27 therethrough which provides for the connection of the hitch bar 18 to the towing bar 19 in the manner described more particularly hereinafter.

The other bar, the tow bar, which is used in the hitch of this invention is formed with an outwardly extending rectangular stop 28 about the periphery of the rectangular end of the tow bar 19 spaced from the connection of the tow bar to the tractor vehicle.

The elongated tow bar 19 is provided with a hole 29 at one end thereof which extends transversely of the tow bar, and a smaller rectangular end 21 having a slot 30 therethrough for registeration with a rectangular slot in a related and connected hitch bar. A vertical pin 31 extends through the boss 26 and holes 32 in registeration with the holes 29 at the time when the above noted bars are to be connected together.

A bolt 34 extends transversely of the hitch and is engageable within the above noted registered slots in both the rectangular cylinders 20 and 21 when the hitch bar is moved for telescopic engagement with the tow bar.

A chain 35 is connected at one end to the hitch bar 18 and at its other end to the vertically extending pin 31 so that the pin will not be lost from the hitch.

At the time when the general purpose hitch 15 is to be used the hitch bar 20 is initially connected to one end of a trailer and the tow bar 19 is connectable to one end of the tractor with the ends of the respective bars lying loosely therefrom so that these free ends may be raised from the ground at the time when the tractor is moved in the direction of the trailer the rectangular ends of the bars being in registry with each other before the above noted pins are slid into their respective connecting openings. In other words the tractor need not be aligned perfectly with the trailer as the hitch bars are pivotally mounted at their ends which connect to the tractor and the trailer and the free ends of such bars are manually movable before the hitch is completely connected.

Referring particularly to Figs. 7, 8, 9 and 10 of the drawings there is shown a means for locking the bars together after they are telescopically engaged at the time when the hitch is connected between a tractor and trailer. The reference numeral 40 designates generally a modified hitch having a longitudinally extending hitch bar 18 pivotally connectable to a trailer and slidably connected to a tow bar 19 which is pivotally connected to the trailer in much the same manner as the hitch bar 18 and tow bar 19 described hereabove.

There is provided a slidable latch releasing and locking bar 44 on the hitch bar 18 which locking bar is slidable longitudinally of the hitch bar and is connected thereon by a pair of longitudinally spaced apart fixed guides 45. The guides 45 are generally U shaped in configuration and are secured to the tow bar 19 as can be clearly seen by the showings in Figs. 7, 8 and 9.

There is provided a perpendicular arm 46 at one end of the bar 44 and this arm 46 threadably carries a screw 47 therein for adjustable engagement with a latch releasing bar 50 which engages the shank of the bolt 31a which connects the tow bar 19 with the hitch bar 18 after the connecting bolt 31a has been slid into engagement with the respective openings of the hitch bar and tow bar.

When the slidable lock bar 44 has been moved to a position where the screw 47 is engageable with its nut 49 with the coiled spring 48 at its completely tensioned position the nut 49 may be threaded onto the screw 47 to secure the screw in its proper locking position with the tow bar and hitch bar telescopically engaged together.

The latch pin 50 comprises an elongated inclined flat latch strip which is hingedly mounted on the hitch bar 18 rearwardly from the coiled spring and adjacent to the extreme rear end of the tow bar, this latch bar 50 being mounted with a hinge at one end thereof so that the flat latch 50 may be moved manually to a raised position or a lowered position depending upon the connection together of the hitch bar and tow bar. A coil spring 48 normally biases latch bar 44 away from latch 50.

The hinge includes a longitudinally extending slidable hinge pin 52 slidable along the length of the barrel 54 which is formed on or connected to one end of the flat latch bar 50. The hinge pin 52 is also connected adjacent the ends thereof in an opening in the hinge arms 55 which are secured to the hitch bar 18, connected to the trailer. The latch bar 50 is adapted to engage the keeper notch 57 formed in pin 31a so as to hold pin 31a normally in raised position. When the stop 28 of tow bar 19 strikes the end of hitch bar 18 locking bar 44 is moved to cause screw 47 to disengage latch 50 from notch 57 of pin 31a, which will then gravitatingly drop to lock hitch bar 18 to tow bar 19.

While the specific details of this invention have been herein shown and described, the invention is not confined thereto as changes and alterations may be made without departing from the spirit and scope thereof as defined in the appended claim.

We claim:

A trailer hitch comprising a pair of tubular members disposed in telescopic relation, a stop fixed to the inner one of said members limiting the movement of said members relative to each other in one direction, each of said members having elongated registrable openings in opposed walls thereof, a bolt loosely engaging through said openings, a pair of parallel bars fixed to the outer one of said members and extending rearwardly therefrom, a hitch pin extending through the rear ends of said bars, said members having aligned openings adapted to register with each other when the outer one of said members abuts against said stop, and a locking pin engageable through said latter named openings for holding said members against movement relative to each other, said locking pin being formed with a keeper notch, a latch carried by the outer one of said members engageable in said keeper notch for holding said locking pin in released position, a latch releasing bar including an elongated side with short right angularly disposed side, the end of said elongated side projecting beyond the end of said outer member, a spring normally biasing said latch retaining bar away from said latch, a pair of guides carried by said outer member, said elongated side slidably engaging said guides, said short side projecting over said outer member, an adjustable latch engaging screw threaded bolt carried by said short side, said spring normally urging said latch releasing bar to inoperative position where the inner end thereof projects from the end of said outer member in a position to disengage said latch from said keeper upon engagement of said stop with said projecting end of said latch releasing bar.

References Cited in the file of this patent

UNITED STATES PATENTS

| | | |
|---|---|---|
| 1,649,980 | Schlagenhauf | Nov. 22, 1927 |
| 2,113,338 | Wohldorf | Apr. 5, 1938 |
| 2,339,155 | Cusack | Jan. 11, 1944 |
| 2,415,479 | Forney | Feb. 11, 1947 |
| 2,441,285 | Pfeiffer | May 11, 1948 |
| 2,446,223 | Forney | Aug. 3, 1948 |
| 2,593,247 | Benteman | Apr. 15, 1952 |